US005490208A

United States Patent [19]

Remillard

[11] Patent Number: 5,490,208
[45] Date of Patent: Feb. 6, 1996

[54] APPARATUS AND METHOD FOR VOICE MODE AND DATA MODE TELEVISION-TO-TELEVISION COMMUNICATION

[75] Inventor: Roger Remillard, Skokie, Ill.

[73] Assignee: Viscorp, Chicago, Ill.

[21] Appl. No.: 333,558

[22] Filed: Nov. 2, 1994

Related U.S. Application Data

[63] Continuation of Ser. No. 952,435, Sep. 28, 1992, abandoned, which is a continuation-in-part of Ser. No. 770,520, Oct. 3, 1991, Pat. No. 5,396,546.

[51] Int. Cl.[6] ................................................. H04M 11/00
[52] U.S. Cl. ................................................. 379/96; 348/14
[58] Field of Search ................................. 379/93, 96–98, 379/100, 90, 110; 348/14–20

[56] References Cited

U.S. PATENT DOCUMENTS

| | | | |
|---|---|---|---|
| 3,668,312 | 6/1972 | Yamamoto et al. | 358/85 |
| 3,822,363 | 7/1974 | Mayer et al. | |
| 3,912,860 | 10/1975 | Sasabe et al. | 358/85 |
| 4,161,728 | 7/1979 | Insam. | |
| 4,203,130 | 5/1980 | Doumit et al. | |
| 4,329,684 | 5/1982 | Monteath et al. | |
| 4,353,097 | 10/1982 | Takeda et al. | 379/100 |
| 4,361,725 | 11/1982 | Dagnelie et al. | |
| 4,451,701 | 5/1984 | Bendig. | |
| 4,455,570 | 6/1984 | Saeki et al. | |
| 4,456,925 | 6/1984 | Skerlos et al. | |
| 4,581,484 | 4/1986 | Bendig | 379/96 |
| 4,596,021 | 6/1986 | Carter et al. | 379/98 |
| 4,611,227 | 9/1986 | Brockhurst et al. | |
| 4,688,170 | 8/1987 | Waite et al. | |
| 4,695,880 | 9/1987 | Johnson et al. | |
| 4,703,348 | 10/1987 | Yuasa et al. | 379/53 |

(List continued on next page.)

FOREIGN PATENT DOCUMENTS 2628709  12/1977  Germany ................................. 379/53

OTHER PUBLICATIONS

W. Fawer et al, "A Terminal and Telecommunication System for Education", 1974 International Conference on Frontiers in Education, 15–19 Jul. 1974 pp. 79–83.
Telewriting Terminal Sketchphone © 1983, pp. 1–6 Musashino Electrical Communication Laboratory.
Gateway 2000: A Report of the Videotex Industry Association Study on North American Gateway, Oct. 1988.
Hanson, G., "Viewers Get a Piece of the Action," *Insight*, Dec. 24, 1990–Jan. 7, 1991.
Van, J., "Computer Revolution of the 90's May Hit Home Over Phone Lines," *Chicago Tribune*, Mar. 17, 1991.
Update: A Newsletter for Members of the Videotex Industry Association, vol. 9, No. 4, Apr./May 1991.
Update: A Newsletter for Members of the Videotex Industry Association, vol. 9, No. 8, Sep. 1990.
"Home Information Appliance Strategies Plotted," *Consumer Information Appliance 1990*, pp. 2, 5, 9.
Fahri, P., "Interactive Television Gets a Boost," *Washington Post*, (not dated, but prior to Oct. 3, 1991).
Levin, S. L., "Companies Provide Information Services," *Chicago Tribune*, Section 1:11 (Jun. 25, 1990).
Van, J., "International Affairs Library Is," *Chicago Tribune*, Section 7:8 (Mar. 17, 1991).

*Primary Examiner*—Wing F. Chan
*Attorney, Agent, or Firm*—Townsend and Townsend and Crew

[57] ABSTRACT

A television-to-television audio/visual system for exchanging voice and graphical information. Users having a electronic device embodying the present invention, which provides a television with speakerphone capability, can initiate a voice call directly to another such device. After the initial voice mode, the users switch to data mode to send or exchange image data. The system is switchable between modes to allow effective and efficient exchange of information between the users.

6 Claims, 5 Drawing Sheets

U.S. PATENT DOCUMENTS

| | | |
|---|---|---|
| 4,712,191 | 12/1987 | Penna . |
| 4,712,238 | 12/1987 | Gilhousen et al. . |
| 4,736,407 | 4/1988 | Dumas ................................... 379/96 |
| 4,751,578 | 6/1988 | Reiter et al. . |
| 4,860,342 | 8/1989 | Danner .................................. 379/96 |
| 4,873,584 | 10/1989 | Hashimoto . |
| 4,916,737 | 4/1990 | Chomet et al. . |
| 4,987,486 | 1/1991 | Johnson et al. . |
| 5,038,211 | 8/1991 | Hallenbeck . |
| 5,073,926 | 12/1991 | Suzuki et al. ........................ 379/53 |
| 5,093,718 | 3/1992 | Hoarty et al. . |

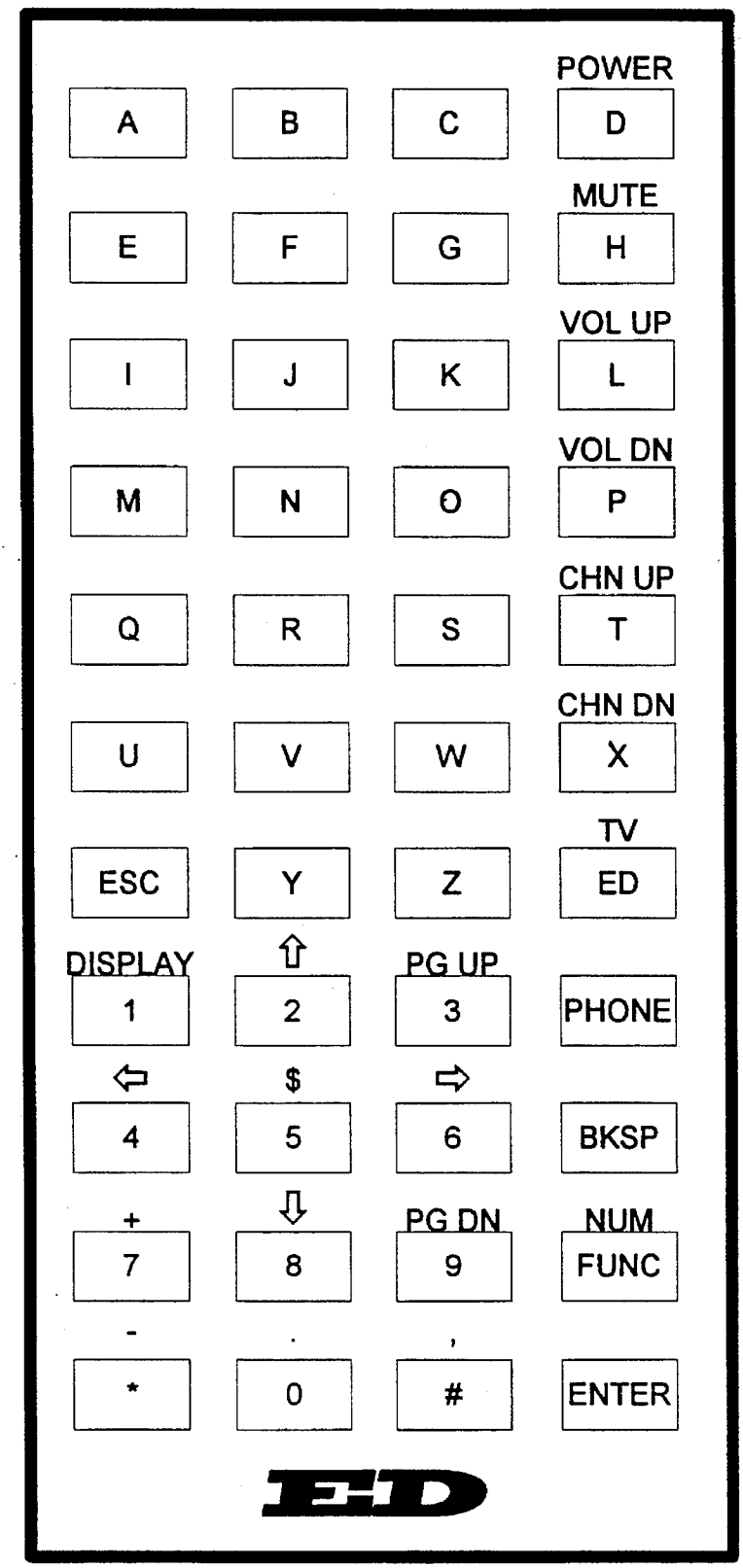
FIG_5

APPARATUS AND METHOD FOR VOICE MODE AND DATA MODE TELEVISION-TO-TELEVISION COMMUNICATION

This is a continuation of application Ser. No. 07/952,435 filed Sep. 28, 1992, now abandoned which is a continuation in part of 07/770,520 filed Oct. 3, 1991, now U.S. Pat. No. 5,396,546.

BACKGROUND OF THE INVENTION

The present invention relates generally to interactivity directly between television sets. More specifically, the present invention relates to an intercommunication system and method for enabling written and oral communication exchange in a simple and efficient manner.

Television has traditionally been a one-way communication medium, with broadcast or cable presentation coming into the home or business. The television medium has been critiqued because of this one-way nature. Interactive systems are developing to allow a television viewer to interact with a particular television program. Many of these devices are expensive or permit operation with only certain programs which have been adapted to work with the system.

SUMMARY OF THE INVENTION

The present invention provides apparatus and method for simply, efficiently and economically interfacing to television programming, user services, or to other users of televisions. Televisions equipped with electronic devices embodying the present invention become two way mediums for the home consumer or business person.

According to one aspect of the invention, the preferred embodiment of the present invention provides the electronic device with a television interface, a communications interface, an input device and a controller. The electronic device may be a separate unit, or integrated into a television or cable converter box, for example. The preferred embodiment of the electronic device includes a speakerphone, using a microphone and the television speaker, to make conventional telephone calls. The controller includes a mode switcher to switch between voice mode operation and data mode operation.

In operation, a user preferably uses the electronic device to initiate a voice call directly to another user employing another electronic device. Thereafter the two users can agree to exchange graphical information, but switching to a data mode. In data mode, one electronic device sends an image to the other machine. The image can be of virtually any subject matter. Thereafter, the users can switch back to voice mode and discuss the image appearing on both their machines.

An electronic device according to the present invention is applicable to many real world situations. Depending upon the application, different image editing or selection options are available. For example, one application permits a user to initiate a call to a ticket seller. After the user makes the initial voice call to an agent, identifying the event and date, for example, the user and the ticket seller's agent enter data mode. The agent sends a graphic image to the user of a layout of the available seats and associated costs, including other pertinent information. The user selects one or more seats from the available seats using the input device, paying attention to the floor plan for any special considerations the user believes are important. Thereafter, the user and the agent can switch to a voice call to finalize the transaction. In one embodiment, the electronic device could include purchasing data, such as credit card information, and relay this financial information directly to the agent during the data call.

Another application of the system is in education. For example, a student could connect to a professor's system. After agreeing upon a particular lesson and any other parameters, the system is switched to data mode. Questions and information pertinent to the question are sent to the student. The student may be provided with a multiple choice question. The student selects a particular one of the prospective answers using the input device. Thereafter, the professor can determine whether voice discussion regarding the question is necessary, or if another image should be sent to the student for further study.

Still another use would be for two users to participate in a joint enterprise or game, for example. One simple example would be for the two users to participate in a game of tic-tac-toe with each other. After moving, the users could enter voice mode and discuss developments. The system permits dynamic and real time two-way exchange of audio and visual information using ordinary television sets.

Other features and advantages of the present invention will be realized upon review of the remaining portions of the specification, drawing and claims.

BRIEF DESCRIPTION OF THE DRAWING

FIG. 5 is a a preferred embodiment of the remote keypad 22.

DESCRIPTION OF THE PREFERRED EMBODIMENTS

Figure 1:
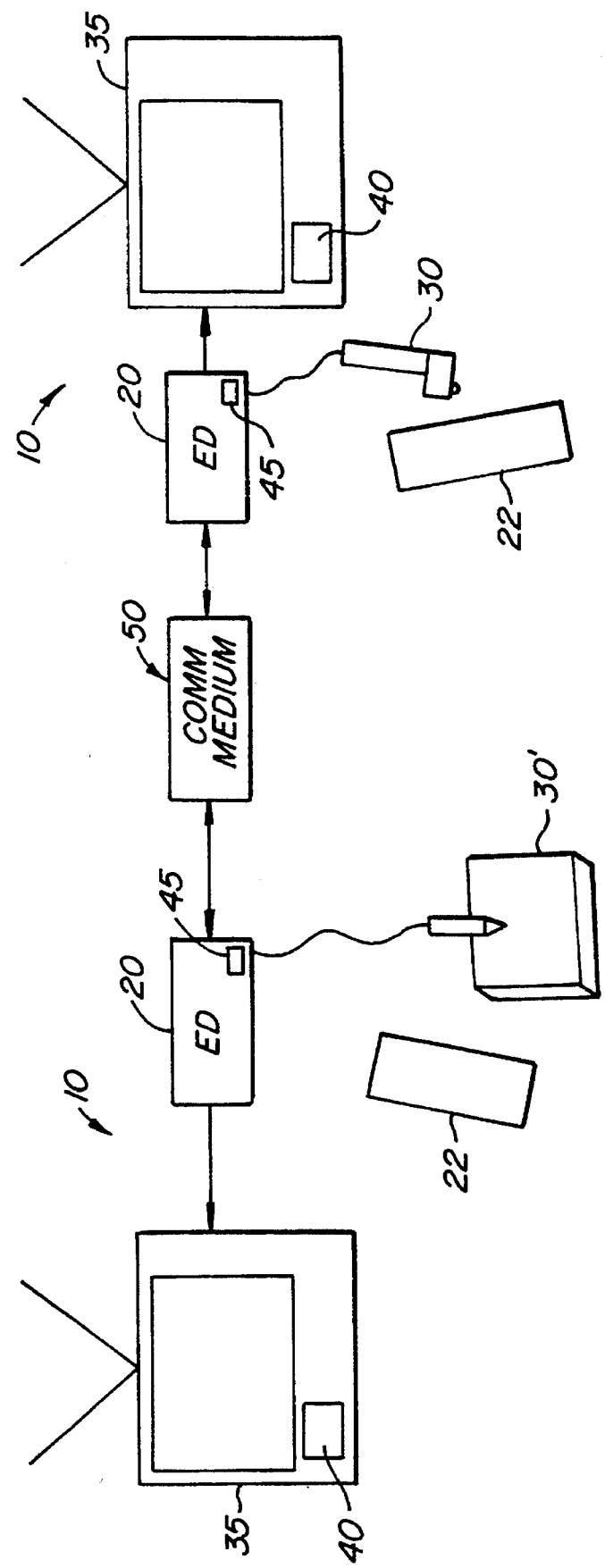
FIG. 1 is a block diagram of a television-to-television audiovisual system 10 including an electronic device 20 embodying the present invention.

FIG. 1 is a block diagram of a television-to-television audiovisual system 10 including an electronic device 20 embodying the present invention. The electronic device 20 is controlled by an input device, such as for example, a keypad remote 22 or a relative pointing device stylus-type pointing device. The relative pointing device may be a mouse pen 30, or a digitizing tablet 30' which issues position information to the electronic device 20. The system 10 includes a television 35 having a speaker 40. The electronic device 20 includes a microphone 45. A communications medium 50, such as a telephone network, connects the electronic devices 20 to each other.

In operation, the microphone 45, the speaker 40 and the remote keypad 22 provide the system 10 with speakerphone capability. A user selects a phone function from the remote keypad 22, activating the telephone system. Using the remote keypad 22, the user enters a phone number of another user having an electronic device 20. The call is placed from the first electronic device 20 to the other electronic device 20 over the communications medium 50 much like a conventional call. The second user answers responds to the call by selecting answer from the remote keypad. The users communicate with each other using their respective electronic devices, similar to speakerphone operation, with incoming audio presented on the television speaker 40 and outgoing audio received by the microphone 45.

The users will switch, using the electronic devices 20, to data mode from the voice mode. In the data mode, graphic images are exchanged between the users and displayed on the screen of their respective television. The received graphic image may be optionally displayed on the entire screen (with a television broadcast optionally in a "viewing window"), or in its own window overlaying the television broadcast. The users can view, edit, interact with, or print the graphic. Editing or interaction is performed using the remote keypad 22 or the stylus pointing device 30. The edited image, or data relating to the interaction, is sent back in data mode to the other electronic device 20. The receiving electronic device can modify the image or respond to the received signal as appropriate.

One user may desire to return to audio mode. The desire is transmitted to the other user who receives a signal indicating a switch to audio mode is desired. The receiving electronic device 20 can be in automatic mode which automatically switches modes, or wait for the user to select the change if it is in a manual mode. For manual mode, the switch may result from selection of an appropriate icon displayed on the television screen, or selection of a predefined key combination of the remote keypad 20.

Figure 2:
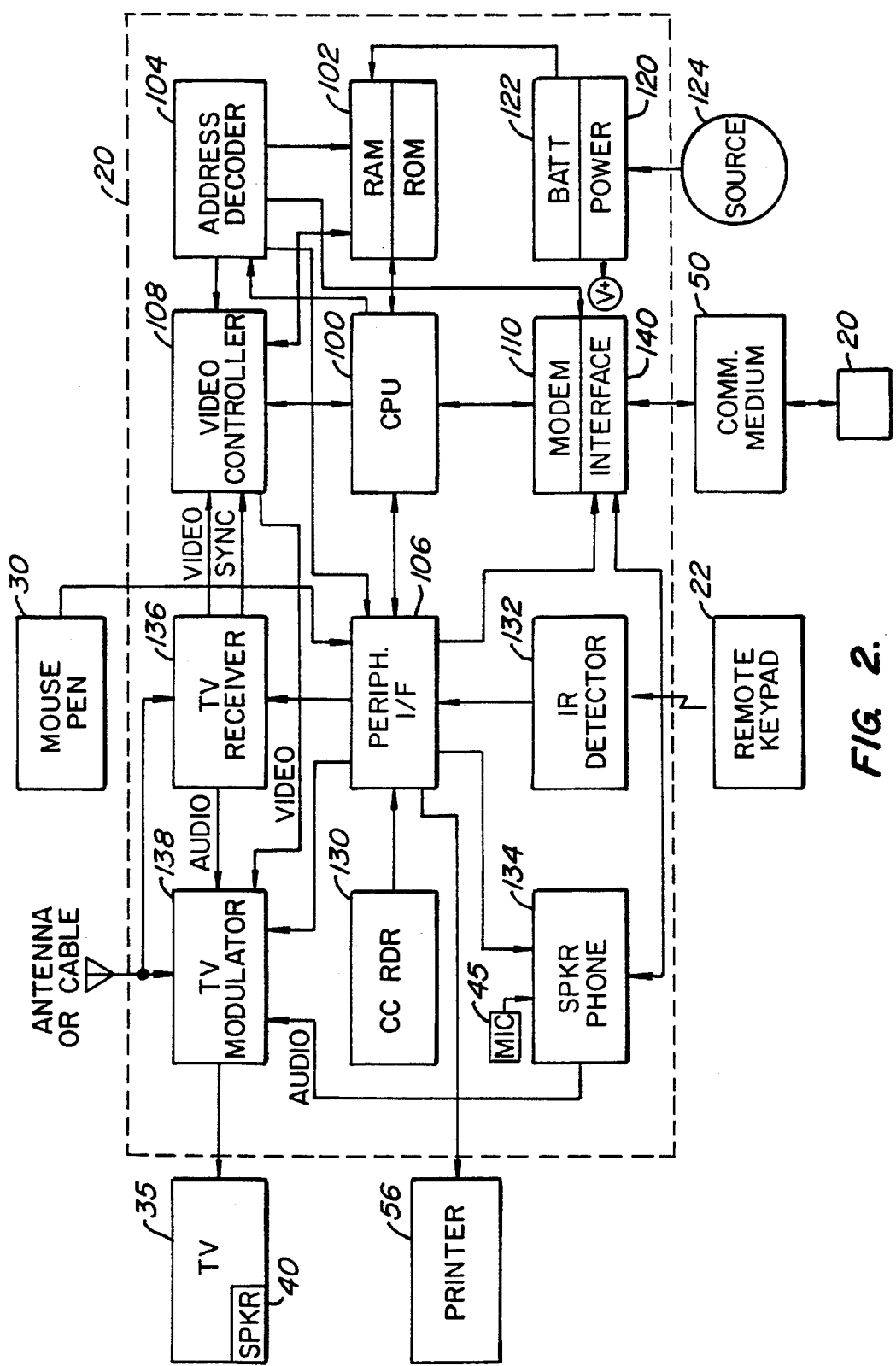
FIG. 2 is a block schematic diagram of the electronic device 20.

FIG. 2 is a block schematic diagram of the electronic device 20. The electronic device 20 is a microcontroller-controlled electronic appliance including a central-processing unit (CPU) 100 coupled to a memory 102, an address decoder 104, a peripheral interface 106, a video controller 108, and a modulator/demodulator (modem) 110 by a data and address bus. The memory 102 includes both random read/write memory (RAM) and read-only memory. A power supply 120 generates power for the components of the electronic device 20 ($V^+$), as well as to keep a battery-backup 122 charged. The battery-backup 122 provides power for the RAM when the power-supply 120 is not connected to a power source 124. Additionally, the electronic device 20 includes a credit card reader 130, an infrared detector 132, a speakerphone controller 134, a television receiver circuit 136, and a television modulator 138, all coupled to the peripheral interface 106.

The CPU 100 controls operation of the electronic device 20 according to instructions stored in the ROM and the RAM of the memory 102. The ROM includes an initialization sequence which the CPU 100 executes upon every reset or power-up. The initialization sequence includes a set of commands causing the electronic device 20 connect to a particular facility 30 and self-configure itself. The self-configuration includes receipt of particularized instructions for the particular electronic device 20, depending upon an identification code stored in the ROM. The CPU 100 stores these particularized instructions in the RAM.

The CPU 100 addresses the components of the electronic device 20 through the address decoder 104. The address decoder receives addresses from the CPU 100 and asserts a select signal to an identified component in response to a particular address. Components with an asserted select signal from the address decoder 104 interact with the CPU 100, either receiving instructions or providing dam.

The peripheral interface 106 includes a parallel input/output port as well-known for interfacing to a printer 56, to the credit card reader 130, and to the IR detector 132. The peripheral interface 106 includes a serial interface for the pointing device 54. The parallel interface and the serial interface are separately selectable by the address decoder 104.

The television interface includes a video controller 108 for text and graphics, connected to a video memory and the video modulator 138 to produce television-compatible output. The television interface connects to a conventional television 38 for display of menus identifying the various facilities available to a user, and for displaying the information provided from a selected facility, as well as to enable screen-to-screen communication. The modem 110 includes a modulator/demodulator used for data calls, to convert digital data to a format compatible with the communications medium, such as a conventional telephone system. Additionally, the modem 110 includes a communications interface 140 to actually send and receive signals relative to the communications medium. The speakerphone controller 134 interfaces directly to the modem interface 140 to implement the speakerphone operation.

The modem 110, through its modem interface 140 particularized for the communications medium used by the electronic device 20, communicates over the communications medium 50 to another electronic device 20. The modem 110 and the interface 140 permits the electronic devices 20 to exchange voice and data information. The CPU 100, under control of a program in the memory 102, controls the operational mode (voice or data).

The credit card reader 130, a conventional device, reads magnetically encoded information on credit and debit cards. The credit card reader 130 provides output information to the CPU 100 through the parallel input/output function of the peripheral interface 106.

The IR detector 132 receives menu selection signals from the keypad remote control 52. The IR detector 132 provides the CPU 100, through the peripheral interface 106, with particular key information selected.

Figure 3:
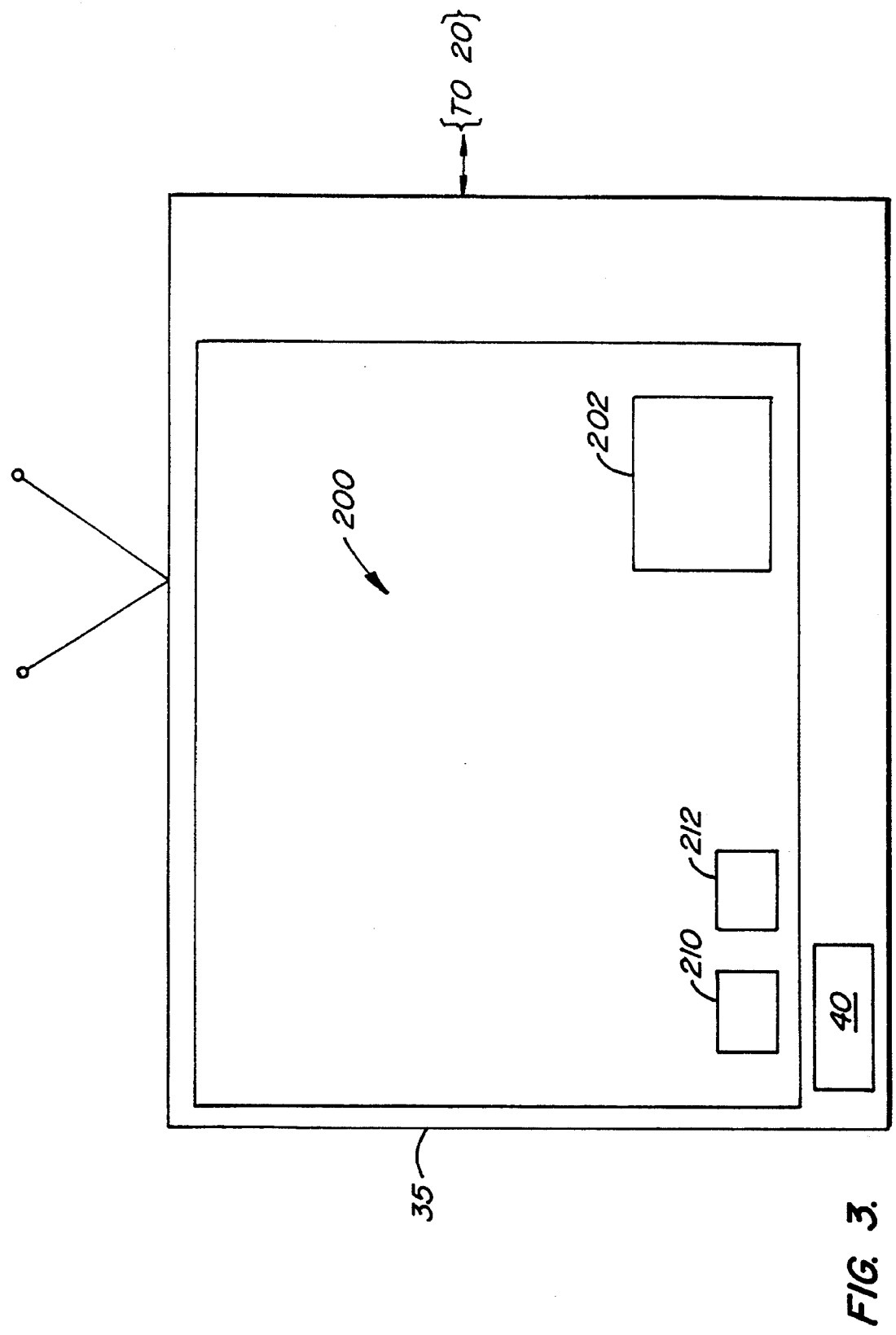
FIG. 3 is an illustration of a exemplary presentation on a screen of a television 35.

FIG. 3 is a illustration of a exemplary presentation on a screen of a television 35. The television 35 includes a display screen 200 which conventionally presents television or cable broadcasting. In operation, the display screen 200 may be wholly dedicated to the television-to-television communication or the display may include a viewing window 202. If the display screen 200 presents television broadcasting, the window 202 may be used for the graphic part of the screen-to-screen function, while conventional television programming is displayed. This would provide, for example, a mechanism for two users to comment on a particular program while viewing it. Alternatively, the conventional television programming function could be placed in the viewing window 202, dedicating the main screen display 200 to the screen-to-screen communication. The screen display 200 may also include icons 210 and 212. These icons could assist in the screen-to-screen communication. For example, selection of one icon, icon 210, could switch the system 10 to voice mode, while selection of the other icon 212 could switch to dam mode.

To signal a switch from data mode to voice mode, selection of the icon 210 by a first user (signaling this desire to switch to voice mode) could, for example, cause the icon 210 on the screen display 200 to animate, or speaker 40 to produce an audible signal. Thereafter, the selection of the icon 210 by the second user places the system into the voice mode of operation. In the voice mode, the users can orally agree to enter the data mode, and thereafter choose icon 212.

Figure 4:
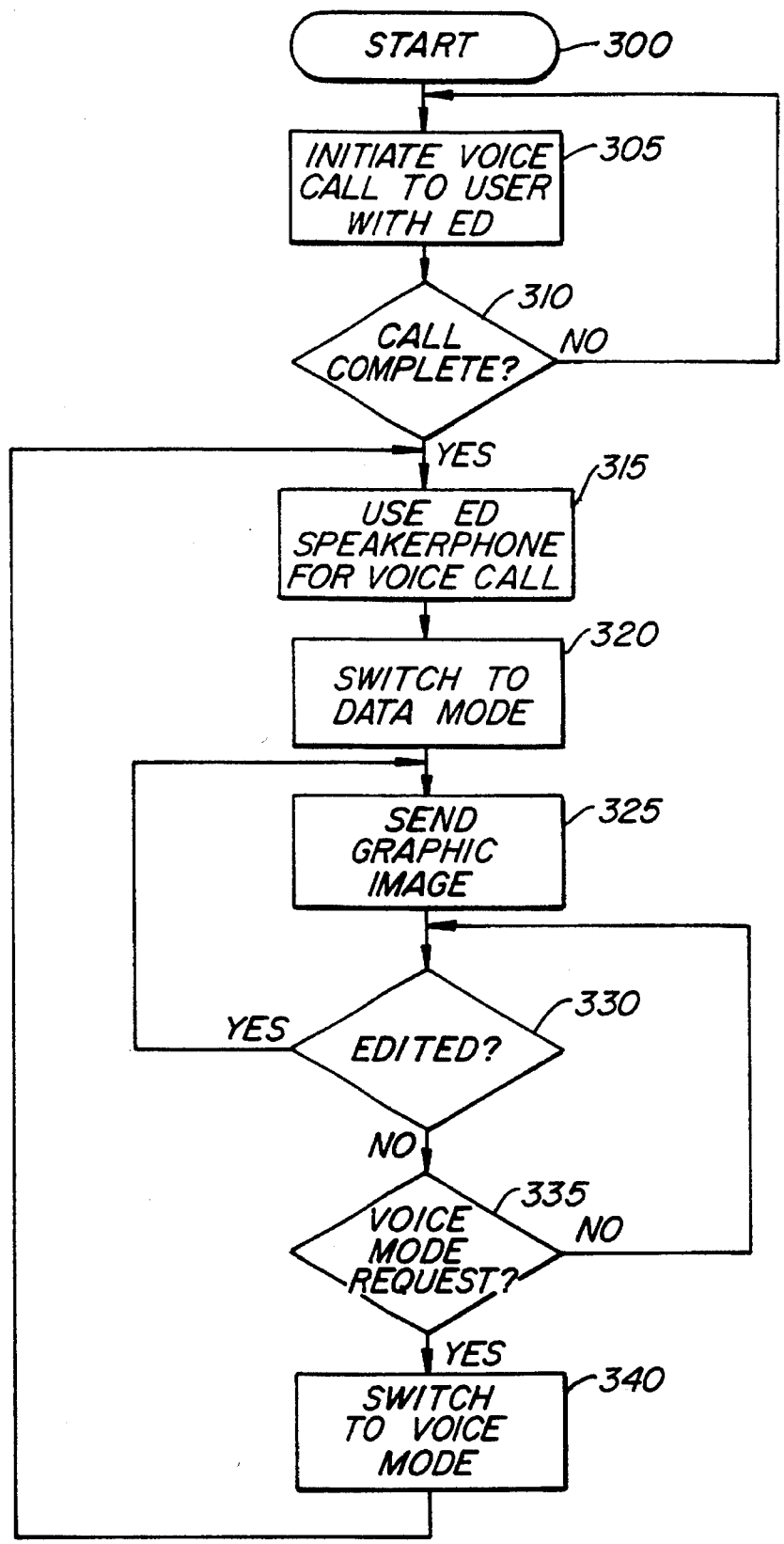
FIG. 4 is a flowchart illustrating general operation of the system 10.

FIG. 4 is a flowchart illustrating general operation of the system 10. The system 10 operation begins at step 300. The system 10 responds to a user's command to initiate a screen-to-screen call to another user with an electronic device 20, step 305. The system 10 checks to see if the call has been connected, step 310. If it is not connected, the system returns to step 305, otherwise the system advances to step 315. At step 315, the users conduct a typical telephone conference, preferably using the electronic device's speakerphone capability. If using the speakerphone capability, the users can switch immediately to data mode, step 320. Otherwise, one user will have to activate the electronic device 20 connected to their television 35. This is expected to be one operational mode.

After switching to the data mode, one user sends the other graphical information, step 325. The system 10 checks to see if its user edited the screen display at step 330. If so, the system returns to step 325 to send the update information, or the updated image, depending upon the editing and the application. If no editing had been done, the system 10 advances to step 335. Step 335 determines if one of the users requested a switch to voice mode. If not, the system returns to step 330. If a request has been made, the system switches to voice mode, step 340, and then returns to step 315. The switch to voice mode, step 340 can be implemented to be manually controlled, or automatic, again depending upon a particular application. Note that although the one preferred embodiment is illustrated as shown, that other implementations are possible. For example, the system 10 could be interrupt driven, causing particular step to be executed in response to some signal from the system 10.

FIG. 5 is a a preferred embodiment of the remote keypad 22. FIG. 5 illustrates the use of an alpha-numeric array of keys to effectively and efficiently control the two-way communication of audio/visual information.

In conclusion, the present invention provides a simple, efficient solution to a problem of effective two-way communication, The electronic device, coupled to a conventional television and to a communications medium, allows users to directly and simply exchange, view, or edit virtually any graphical, written, textual, or image data, and to thereafter simply and efficiently to discuss the graphical data. While the above is a complete description of the preferred embodiments of the invention, various alternatives, modifications, and equivalents may be used. For example, while the above-description identifies manual switching between the different modes, it is possible for the systems to switch automatically. Therefore, the above description should not be taken as limiting the scope of the invention which is defined by the appended claims.

What is claimed is:

1. A system for remotely interfacing two consumer televisions comprising:

first and second telecommunication interfaces each of said first and second telecommunication interfaces comprising:

a telephone interface adapted to couple to a telephone line and including a modem;

an input device that produces control signals;

an audio input device that receives voice input and generates audio signals;

a modulator that receives video signals and audio signals, modulates said video signals and audio signals onto a broadcast television signal and outputs the broadcast television signal to an external input of a consumer television;

a controller that:

initiates a call to the other telecommunication interface via said telephone interface responsive to a first particular control signal produced by said input device, said call beginning in a voice mode, wherein received audio signals are audiblized through said modulator and said consumer television;

switches a voice call between said telecommunication interfaces to a data mode responsive to a second particular control signal produced by said input device, wherein during said data mode, only image data and no audio signals are exchanged via said telephone interface; and converts image data received during said data mode to video signals for display as a graphic image via said modulator and said consumer television.

2. The apparatus of claim 1 wherein said controller also:

exits said data mode responsive to a third particular control signal produced by said input device, wherein outside said data mode, only audio signals and no image data are exchanged via said telephone interface.

3. The apparatus of claim 2 wherein said controller also:

generates video signals for displaying icons on said consumer television to prompt a user to enter commands to switch into and out of data mode.

4. The apparatus of claim 1 wherein said input device comprises a stylus-type pointing device.

5. The apparatus of claim 1 wherein said input device comprises a remote keypad.

6. The apparatus of claim 1 wherein said displayed graphical image may be modified in response to commands accepted by said user input device.

\* \* \* \* \*